UNITED STATES PATENT OFFICE.

HENNING WENNERSTEN, OF CHICAGO, ILLINOIS, ASSIGNOR OF ONE-FOURTH TO JOHN W. HILL AND ROY W. HILL, BOTH OF CHICAGO, ILLINOIS.

METHOD OF PRESERVING HOPS.

1,161,272. Specification of Letters Patent. Patented Nov. 23, 1915.

No Drawing. Application filed May 24, 1913. Serial No. 769,645.

*To all whom it may concern:*

Be it known that I, HENNING WENNERSTEN, a citizen of the United States of America, residing at Chicago, in the county of Cook and State of Illinois, have discovered a certain new and useful Method of Preserving Hops, of which the following is a description.

My invention is particularly designed to preserve the fresh or prime hops, or similar flowers or substances, in their best condition, so as to prevent the escape of the valuable volatile elements, such as lupolin, and the deterioration of the hops by reason of the air coming more or less in contact therewith. It is also designed to produce a new product, which will add greatly to the convenience of handling and shipping the hops, which will also preserve them an indefinite length of time in any climate, and which in its nature may readily be employed in the manufacture of beer and other products where hops are essential, insuring accuracy in the use of the valuable chemical elements, or the ingredients employed, and dependability upon the grade or quality of such ingredients.

To this end my invention consists in the novel process and product herein described, and more particularly pointed out in the claims.

Heretofore, the common and usual method of packing hops for the market has been to gather the flowers together in bales, which may be covered with a suitable fabric to aid in retaining them in the bale and prevent somewhat the escape of the valuable elements thereof. It is a common practice to keep such bales in cold storage to prevent deterioration, and it is sometimes found, upon opening the bale, particularly if it has been out of storage only a few days, that the quality of the material is much depreciated and varies at different points in the bale. This is sometimes also increased by heating on the interior, and sometimes from other causes. It is also common knowledge that hops so handled in bales gradually lose their efficiency and valuable properties, so that after a few months—broadly speaking a year or more—the quality is so reduced as to require a much larger quantity of hops to secure the same satisfactory results. As this deterioration is going on to a greater or less extent from the time the hops are picked until they are used or exhausted, it is always necessary for the party using the hops to very carefully test them as to their quality and condition, that is, the properties of the baled hops, at the particular time when he is using them. If this is not carefully investigated and acted upon, the character of the product, depending upon the hops for some of its valuable features, is likely to vary to a considerable extent. My invention is intended to cure these evils, and taking the hops when they are in their best or prime condition, so treating them that they will retain that grade or condition until such time as they may be used, and to accomplish this in a simple, efficient, and economical manner. At the same time it results in a product arising from this process which is essential in making the usual beverages in which hops are employed, and in which every ingredient will perform its usual function for the purposes for which they are usually employed. Broadly speaking, my discovery is this: Taking the hop flower at the time when it is in its best condition for the purposes for which it is usually employed, I comminute the hop flower in any preferred manner, preferably carrying it to the point where the flower is in powdered or pulverized condition, and the particles very small, and mixing this powder with a viscous liquid, not injurious to health, or detrimental to the usual uses of the hops. The character of this viscous fluid should also be such that evaporation is exceedingly slow, and that it will not materially change its character for this purpose for a long period of time when the hops are mixed therewith. Sugar syrup, which may be saccharoses or glucoses, that is, cane, corn, beet, maple or any other types of sugar syrup, may be employed, including a malt wort syrup, similar or equivalent in the process to that hereafter described. The powder is mixed with the syrup until it forms a thick paste, whereby each individual particle of the hop flowers is evenly coated exteriorly with the syrup and the volatile elements thus entrapped therein. By this means each individual particle, we may say, is varnished with a continuous coat of the viscous syrup, so that there is no space or opening for the volatile elements to escape. As the syrup does not readily evaporate, it will at once be seen that as long as the syrup maintains its function of so coating the particles, there will be no deterioration of the hops.

In practice I prefer to use a rather heavy syrup, and to moderately heat it while mixing the powder therewith, only so as to thin the syrup during the mixing operation, and thus more readily bring about and permit a perfect and thorough mixture of the powder with the syrup. All the powder is used that the syrup will take up, and when completed, the product is preferably in the form of a thick paste. As the syrup cools and again thickens, it will be seen that these individual, syrup-coated particles will become thoroughly cemented together until substantially the whole mass is impervious to air, and only the surface thereof is subject to its action.

It is well known that lupolin has a tendency to prevent fermentation, and it thus helps to preserve the product in which it is used. The old and familiar process of preserving fruits in sugar syrups is also familiar, and the combination of the two in the manner described, in which each individual particle of the comminuted hop flower is not only exteriorly coated or varnished with the syrup, but the intervening interstices or spaces between those particles, when *en masse*, are also fully filled with the same viscous syrup, prevents any fermentation or deterioration, as set forth. While in this condition the product may be placed in any suitable containers and be covered or partially covered, for sanitary reasons, and to prevent dirt or dust coming in contact with the product, and the containers may or may not be hermetically sealed, as preferred, hermetical sealing not being necessary to preserve the product.

It must be particularly borne in mind that the crystallization of the syrup into the sugar or granular form will not satisfactorily carry my process to complete perfection for the reason that when granular the sugar is porous to a greater or less extent, permitting air to gain access thereto, and also permitting the volatile elements of the hops to escape, and while it may be possible that the granular or crystallization process may tend to preserve the valuable properties of the hops for a limited time, it has been found in actual experience that in a comparatively short time the quality of the product is affected and deteriorated, the volatile properties of the hops having escaped, to a greater or less extent.

It will be seen that the hop burdened syrup above described can be used in its entirety in all the processes where hops are usually employed in making beverages and the like, it being necessary, usually, to add more sugar or malt wort to complete the process. With my product, however there is another distinct advantage, as since the hops are comminuted, much less time need be occupied in boiling or heating the mass when making the beverages, to release the lupolin and other elements, and consequently there is far less loss by evaporation or distillation, all of these things leading to the inevitable fact that a less quantity of the hop flowers may be used to secure substantially the same results, and at the same time the entire process is more dependable by reason of the fact that the quality of the hop syrup compound is substantially fixed and remains the same.

If preferred, my improved process may be employed as follows: I first make a malt wort in the usual or well known manner. This may be conveniently done by following substantially the various steps, This may be conveniently done by following substantially the variously the various steps, using substantially the proportions of ingredients herein mentioned. In practice, I first take substantially twenty-three and a half barrels of water, and bring the temperature to about 110 deg. F., at which point I add seventy bushels of ground malt, stirring the mixture continuously for about five minutes. This mash may then rest for about an hour, and is then preferably stirred again, adding about seven barrels of water, increasing the temperature to substantially 147 deg. F. The stirring operation, to secure satisfactory results, should be continued substantially forty-five minutes. This mixture, then, upon resting substantially thirty minutes, becomes clear, and the wort may be tapped off into a kettle, in which the temperature is increased and maintained at about 190 deg. F. The temperature is increased and the wort is then boiled until it curds, indicating the separation of the albuminoids from the wort. At this point I strain the wort into a vacuum pan, and concentrate it into a heavy syrup, indicated by its weighing approximately eleven and a half pounds to the gallon. To this heavy syrup I add hops, in the pulverized or comminuted condition, to make a paste, as above described. With this syrup I find by actual experience, it will satisfactorily take up two and a half to three ounces of the hop powder to one pound of the heavy syrup, or even more.

It is obvious that the process above described may be modified within reasonable limits. The essential features, however, are clearly pointed out above. The product may be placed in any suitable containers to suit the market, and may be closed to entirely exclude the air, or simply partially closed for sanitary reasons, as preferred. Hermetical sealing, as above stated, is not necessary to preserve the product.

What I claim as new and desire to secure by Letters Patent is:—

1. The method of preserving hops and similar substances, consisting in first comminuting the hops, and then thoroughly mixing the same with a slowly evaporating liquid at a temperature below the boiling point, to form a paste, whereby each particle is covered with a continuous coating of the fluid and *en masse* are closely positioned together to prevent the admission of air to the particles of hops.

2. The method of preserving hops, consisting in first comminuting the hops and then thoroughly mixing the same with a viscous, slowly evaporating liquid not injurious to health while below the boiling temperature, to form a paste, whereby each particle is covered with a continuous coating of the viscous fluid and *en masse* the particles are closely positioned and substantially cemented together to prevent the admission of air to the interior of the mass.

3. The method of preserving hops and preventing the escape of the volatile elements thereof, consisting in comminuting the hop flower, and thoroughly mixing the same with a sugar syrup below the boiling temperature to form a paste, whereby the comminuted particles are covered with the syrup and the volatile elements are entrapped therein.

4. The method of preserving hops, consisting of comminuting the hop flower and thoroughly mixing the same with a heavy syrup at a temperature below the boiling point to form a thick paste, whereby the comminuted particles are covered with the syrup and the volatile elements are entrapped therein.

5. The method of preserving hops, consisting in comminuting the hop flower and thoroughly mixing the same in a heavy syrup, heated to a temperature below the boiling point to thin the same while the mixing process is in operation and bring about and permit a more perfect and thorough mixture, whereby each particle is incoated with a continuous coat of the viscous syrup with no space or opening for volatile elements to escape, and *en masse* are closely positioned and cemented together to prevent the admission of the air to the interior of the mass.

6. The method of preserving hops and the like, consisting in comminuting the flower of the plant and thoroughly mixing the same with a heavy syrup below the boiling temperature to form a paste, and placing the paste in a suitable container and sealing the same to exclude the air.

7. The herein described product, comprising a paste consisting in a slowly evaporating viscous liquid, not injurious to health, having intimately mixed therewith comminuted hop flowers, which have not been subjected to a boiling temperature, to form said paste.

8. The herein described product, comprising a paste consisting in a sugar syrup having intimately mixed therewith comminuted hop flowers, which have not been subjected to a boiling temperature, to form said paste.

9. The herein described product, comprising a paste consisting in a heavy sugar syrup having intimately mixed therewith comminuted hop flowers, which have not been subjected to a temperature equal to the boiling temperature, to form said paste.

In testimony whereof, I have hereunto signed my name in the presence of two subscribing witnesses.

HENNING WENNERSTEN.

Witnesses:
L. M. BALDWIN,
CHARLES I. COBB.

Copies of this patent may be obtained for five cents each, by addressing the "Commissioner of Patents, Washington, D. C."